FREQUENCY DISCRIMINATOR FOR USE IN MAGNETOMETER READOUT CIRCUITS

Filed Feb. 23, 1968 2 Sheets-Sheet 1

FIG. I

INVENTORS
GEORGE R. HUGGETT
RICHARD A. MC BRIDE
BY Wm J Nolan
ATTORNEY

INVENTORS
GEORGE R. HUGGETT
RICHARD A. MC BRIDE
BY
Wm. J. Nolan
ATTORNEY

United States Patent Office 3,532,978

Patented Oct. 6, 1970

3,532,978

FREQUENCY DISCRIMINATOR FOR USE IN MAGNETOMETER READOUT CIRCUITS

George R. Huggett, Sunnyvale, and Richard A. McBride, Palo Alto, Calif., assignors to Varian Associates, Palo Alto, Calif., a corporation of California Filed Feb. 23, 1968, Ser. No. 707,689
Int. Cl. G01r *23/00, 23/12*
U.S. Cl. 324—82 2 Claims

ABSTRACT OF THE DISCLOSURE

The readout circuit comprises in sequence a limiter, a square wave symmetry control circuit, a frequency discriminator and a transient suppressor. The frequency and amplitude modulated sinusoidal magnetometer signal is translated into square waves by the limiter. Since the amplitude modulation would cause the square waves to be asymmetrical and degrade the performance of the circuit, the square wave symmetry control circuit generates an error signal which is used to eliminate the effects of amplitude modulation. The frequency discriminator produces an output signal which varies in accordance with the input frequency from the magnetometer. This output signal when plotted against input frequency comprises a ramp or sawtooth, with a period of 1000 Hz., such that the sawtooth repeats for each 1000 Hz. increment of input frequency. A second phase detector produces an identical sawtooth output shifted in frequency by 500 Hz. with respect to the first. A logic switch sensitive to the amplitude of each of the sawtooth waves switches the following circuits between the frequency discriminator outputs to avoid signal distortions which develop at the transition points of the sawtooth waves. A transient suppressor prevents transients from saturating the following filter circuits when different D.C. levels exist on the discriminator outputs at the time of switching. By feeding back the signal being monitored to the output of the unused channel of the frequency discriminator, the same signal is forced to be present on both channels when switching takes place.

CROSS-REFERENCES TO RELATED APPLICATIONS

Figure 1:
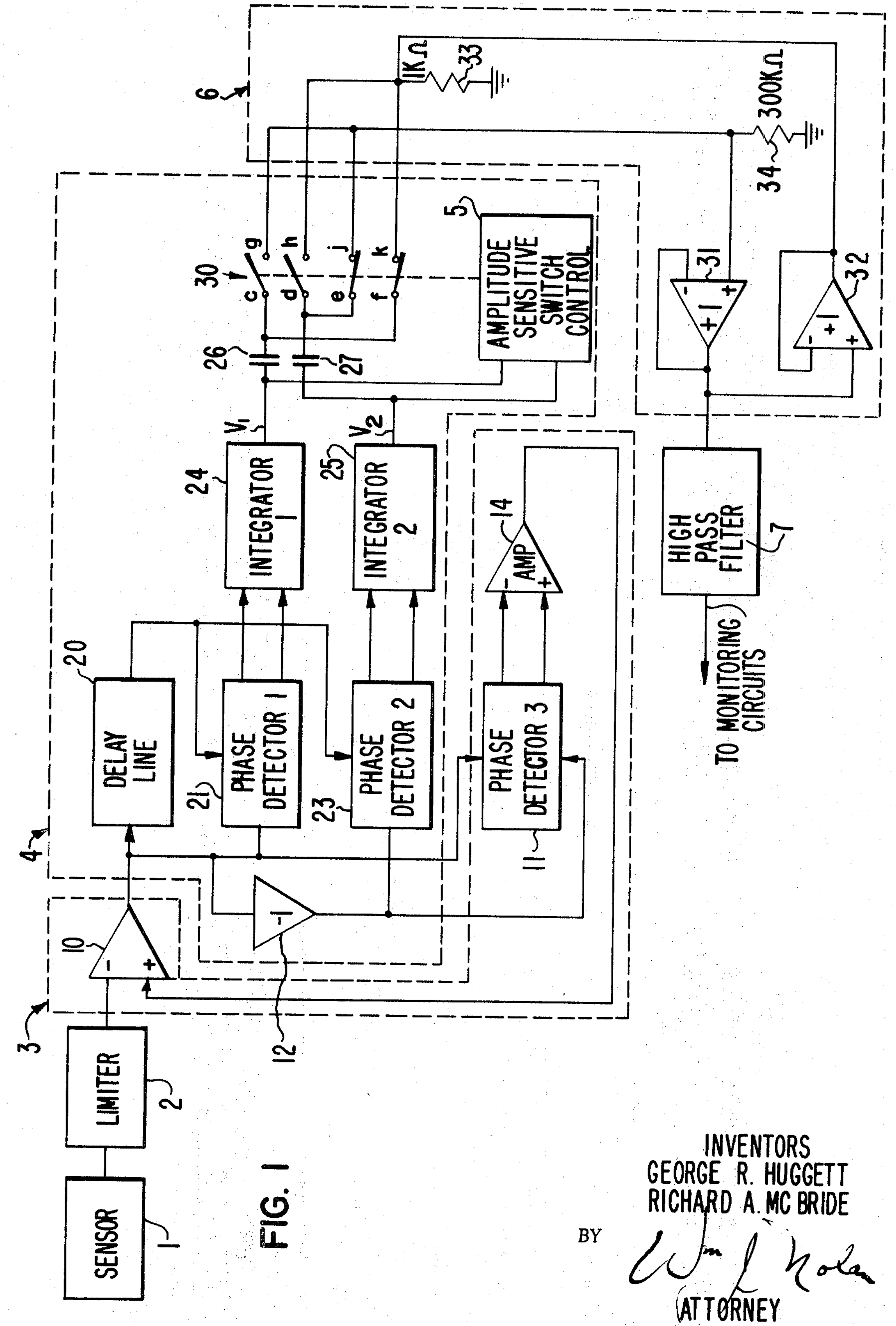

The subject matter disclosed herein comprises as well the subject matter of copending U.S. application Ser. No. 707,686, filed Feb. 23, 1968, now Pat. No. 3,482,623, entitled, "Square Wave Symmetry Control Circuit for Use in Magnetometer Readon Apparatus," and U.S. application Ser. No. 707,655, filed Feb. 23, 1968, entitled, "Transient Suppressor for Use in Magnetometer Readout Apparatus," both assigned to the same assignee as the instant application.

BACKGROUND OF THE INVENTION

The present invention relates, in general, to readout circuits for magnetometers and gradiometers and, in particular, to a novel, simplified and relatively inexpensive automatic frequency discriminator for use in such systems.

Ordinarily, the frequency of the signal received from a magnetic field intensity sensor, such as an alkali vapor magnetometer, is a direct function of the magnetic field intensity. It becomes desirable in most systems and for purposes of data recording and processing to effect a transformation of the FM signal from the magnetometer or the like to a linearly related DC signal, the amplitude of which is a function of the signal frequency and thus, a measure of magnetic field intensity. A frequency discriminator is used for this purpose. Various types of frequency discriminators are known, but most are either too complex, require exacting operator controls and are generally very expensive. In one, the input signal is compared to itself after having been delayed in time a predetermined number of microseconds. The resulting output, a varying DC signal, is substantially a linear function of the frequency of the input. The DC output signal, however, is not continuous over the entire frequency range, but, repeats at integral multiples of a frequency interval as determined by a predetermined period of delay. At the transition points of the output signal, that is, at the points where the output signal repeats, serious discontinuities appear which create severe signal wave form distortion and will tend to saturate and cause ringing of following circuit elements, such as filters.

SUMMARY OF THE INVENTION

The discontinuities and resulting distortion obtained at the output of prior known frequency discriminators are avoided by the present invention which incorporates a pair of parallel phase detectors each of which is referenced to the same signal.

According to the present invention, a magnetometer, whose output signal frequency is a function of magnetic field intensity, is coupled to a limiter and square wave symmetry control circuit to provide a square wave representative of the input signal frequency. The output of the square wave symmetry control circuit is coupled to one input of each of the phase detector and to a delay network. The output of the delay network is coupled to the remaining input of each of the detectors for providing a reference signal for synchronizing the outputs of the detectors. One of the detector inputs from the square wave symmetry control circuit is inverted such that one detector is triggered on the leading edge of the limiter square wave while the second detector is triggered on the trailing edge. An integrator is coupled to the ouput of each of the phase detectors for summing and filtering the detector outputs. The resulting DC signals from each of the integrators are in the form of a sawtooth, the slope of each of which is a linear function of the input signals frequency. The sawtooth signal which appear on each of the integrator outputs, though similar in form, however, are displaced or shifted by a frequency $\frac{1}{2\tau}$ hertz relative to each other due to triggering the two phase detectors on the leading and lagging edge of the same square wave, respectively.

The two frequency discriminator outputs, say channel 1 and channel 2, are coupled to an amplitude sensitive switching network which switches between channels to provide a signal to the following circuits before either of the channels reaches its maximum DC output level or transition point.

By means of the amplitude sensitive switching network, the signal intended for the following circuits is switched to, say channel 2, when channel 1 is at about 75 percent of its maximum. As the switching occurs before either of the channels reaches its respective limit, the distortion caused by the discontinuities at the transition points will not be coupled to the following circuits. This prevents the loss of information and blocks the distorted signal created by the discontinuities.

Among the immediate advantages realized, the present invention avoids the use of any phase locked loops, eliminates the need for externally operable controls, exhibits a wide dynamic range and is generally less complex and relatively less expensive than prior known frequency discriminators used in magnetometer readout circuits.

Accordingly, a primary object of the invention is a less complex, relatively inexpensive automatic network for magnetometer readout circuits.

Another object of the invention is a frequency discriminator network for use in magnetometer readout circuits.

Another object of the invention is a frequency discriminator of the described type employing a pair of phase detectors referenced to the same signal.

Another object of the invention is a frequency discriminator as described with two output channels for providing an automatically selected transient and distortion free output to monitoring circuits.

Another object of the described invention is a frequency discriminator provided with an amplitude sensitive switching circuit adapted to switch following monitoring circuits between two available output channels of said frequency discriminator.

Another object of the invention is a frequency discriminator as above described wherein each of said channels provides a sawtooth output signal as a function of input signal frequency, similar in form, but, relatively displaced in frequency by $\frac{1}{2}\tau$.

Another object of the invention is a frequency discriminator as described wherein said amplitude switching circuit switches to a second channel whenever the channel being monitored reaches a predetermined DC amplitude level.

Figure 2:
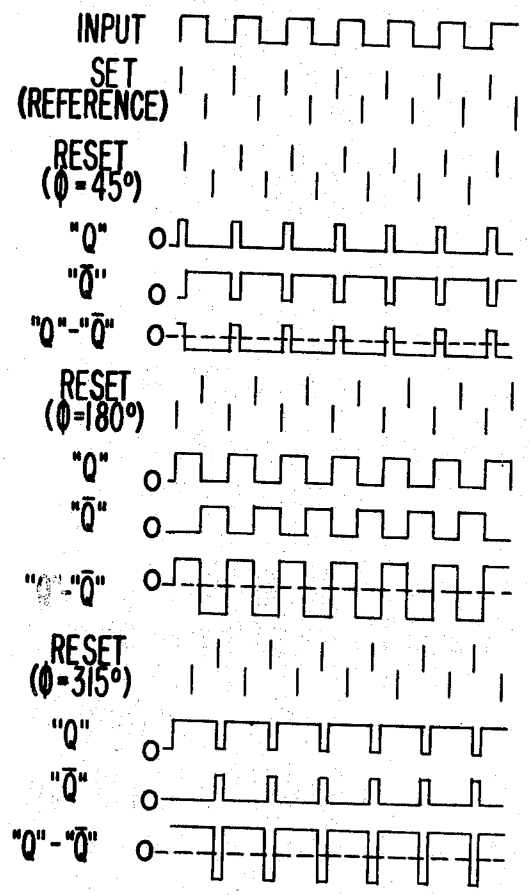
Figure 3:
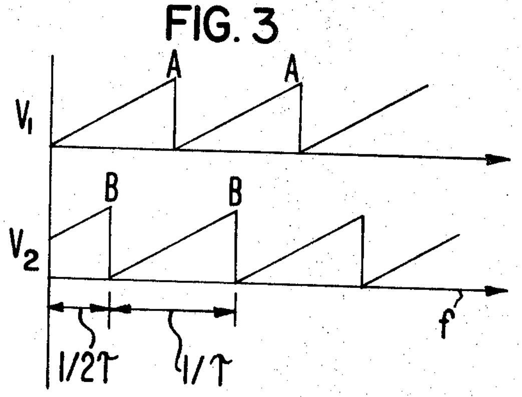
Figure 4:
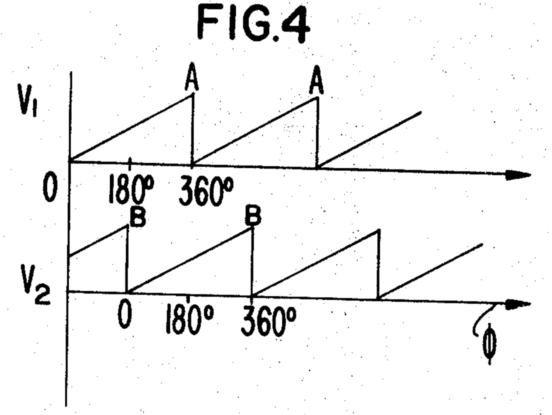
Figure 5:
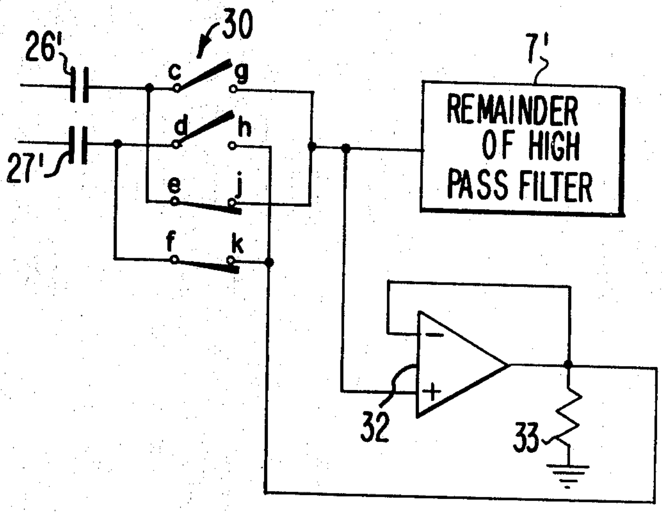

Other objects, features and advantages of the present invention will become apparent in the following detailed description when considered together with the accompanying drawings in which:

FIG. 1 is a block diagram of the circuit embodying the present invention,

FIG. 2 is a wave form diagram of the input and output voltage associated with one of the frequency discriminator phase detectors, FIG. 3 is a diagram of the sawtooth voltage output of the frequency discriminator, FIG. 4 is a diagram of the sawtooth voltage output signals of FIG. 3 in terms of relative phase angle, FIG. 5 is a partial schematic diagram of an alternative embodiment of the apparatus embodying the present invention.

In FIG. 1, there is shown a magnetometer readout apparatus embodying the present invention. A sensor 1, such as a magnetometer and a limiter 2 are coupled to a square wave symmetry control circuit 3. The square wave symmetry control circuit 3 provides symmetrical square waves or pulses to a frequency discriminator 4. Frequency discriminator 4 is coupled by means of an amplitude sensitive switch 5 to a transient suppressor 6. The output of transient suppressor 6 provides, in turn, a useable transient and distortion free signal to a high pass filter 7 which functions as the input element for following monitoring circuits (not shown).

Sensor 1, which may be, for example, an alkali vapor magnetometer, provides a precession signal in the form of a sine wave the frequency of which is directly proportional to the intensity of a magnetic field being measured. The precession signal, in addition to frequency modulation, also exhibits amplitude modulation which may range from .5 volt to 5 volts peak-to-peak.

Limiter 2, which functions to transform the precession sine wave signal into a representative square wave signal, produces a square wave which is caused to be asymmetrical as a result of the amplitude modulation of the precession signal. For reasons given presently, the asymmetry of the limiter 2 output square waves is reflected in the output of frequency discriminator 4 in the form of phase jitter. The square wave symmetry control circuit 3 is provided, therefore, between limiter 2 and frequency discriminator 4 to eliminate the phase jitter by phase comparing the leading and lagging edges of each of the square waves received from limiter 2 by generating therefrom a compensating error signal.

Frequency discriminator 4 is adapted to receive and phase compare to itself each of the square waves from square wave symmetry control circuit 3 after each has been delayed a predetermined number of microseconds $\tau$. As will be described more fully with respect to FIG. 3, the resulting outputs of frequency discriminator 4 are two channels or output signals of DC voltage levels which vary as a function of the frequency of the sine wave signal from sensor 1. Over the entire frequency range of interest the DC voltage levels take the form of a sawtooth the period of which is determined by the delay $\tau$ and is equal to a frequency change of $1/\tau$ Hertz. The ramp or sawtooth signals provided on each of the two output channels, say channel 1 and channel 2, of frequency discriminator mum, the large change in DC voltage at the transition other and coupled by means of amplitude sensitive switch 5 to transient suppressor 6.

Amplitude sensitive switch 5 detects the amplitude of each of the ramp signals and switches transient suppressor 6 from one channel to the other when the amplitude of the ramp on the channel being monitored reaches a predetermined level, say 75 percent of the maximum. By switching before the ramp being monitored reaches maximum, the large change in DC voltage at the transition points A and B as shown in FIG. 3 will only distort the signal in the channel not being monitored.

While the distortion at the transition points may be thus avoided, a difference in the DC and AC levels between channels 1 and 2 at the time of switching will result in saturation of the high pass filter 7. To avoid this source of saturation and the resultant signal distortion in the high pass filter 7, the transient suppressor 6 is coupled between amplitude sensitive switch 5 and high pass filter 7. By monitoring the signal being delivered to high pass filter 7 and feeding it back in phase to the output of the channel not then being monitored, transient suppressor 6 forces the high pass filter 7 to "see" the same DC and AC level on both channels at the time switching takes place.

Referring now to FIGS. 1, 2, 3, and 4, a detailed discussion of the circuits will now be undertaken.

Limiter 2, consisting of seven stages of gain-limiting amplifiers puts out a square wave the leading and lagging edges of which vary in relation to each other as a function of the amplitude of the incoming sine wave precession signal. This is due to the fact that the transistors comprising the limiter 2 "turn-on" and "turn-off" at specified input signal levels. Thus, the transistors will be turned on sooner and turned off later for high amplitude signals than for low amplitude signals of the same frequency.

To correct the asymmetry of the square wave thus produced, there is provided a differential comparator 10 the inverting input (−) of which is coupled to the output of limiter 2. The output of comparator 10 is coupled to the inputs of a flip-flop linear phase detector 11 directly and through an inverter 12, respectively. Since phase detector 11 is designed to operate on positive going pulses, the result is that the leading and lagging edges of the square waves are compared. The net result is that phase detector 11 provides a zero output when the inputs are 180 degrees out of phase and a nonzero output when any other relationship exists. The error signal at the output of phase detector 11 is then amplified in an amplifier 14 and applied to the noninverting input of comparator 10 for controlling its switching point. The resulting symmetrical square waves are then coupled to the frequency discriminator 4.

As shown in FIG. 1, the square waves from square wave symmetry control circuit 3 are applied simultaneously to the inputs of a delay network 20, a first linear phase detector 21 and the inverter 12 discussed above with respect to symmetry control circuit 3. The output of inverter 12 is coupled to a second linear phase detector 23. The output of delay network 20, for example, a magnetostrictive delay line, is coupled to both phase detector 21 and 23 to reference both phase detectors to the same signal. Both phase detectors 21, 23 are preferably flip-flops and preferably, the delayed signal is applied to their respective reset inputs. It should be understood, however, that the set inputs could be used as well.

As shown in FIG. 2 which shows the input and output pulses for one of the phase detectors, a phase detector is set on the leading edge of a positive going pulse. Phase detector 21 is set on the leading edge of the pulses from square wave symmetry control circuit 3, whereas, due to inverter 12, phase detector 23 is set on the trailing edge. Since both phase detectors 21 and 23 are reset a time $\tau$ later by the leading edge of the same pulse, it is apparent that any change in asymmetry between the leading and trailing edges of the square waves would be reflected as phase jitter between the inputs of phase detector 23. This phase jitter is eliminated by square wave symmetry control circuit 3 as heretofore discussed.

In series with and coupled to the outputs of phase detectors 21, 23, respectively, are provided a pair of integrators 24, 25, and a pair of DC blocking capacitors 26, 27. Integrators 24, 25 integrate the outputs of phase detectors 21, 23, respectively, yielding, as shown in FIG. 3, an output that has a sawtooth wave form as a function of frequency.

The two sawtooth wave forms as shown in FIG. 3 are repetitive in 1K Hz. increments of the input signal where the delay $\tau$ provided by delay network 20 is 1000 microseconds and can be expressed mathematically as $$V_{out}=-V+K(f-f_L)\pm\frac{mK}{2}(1000),\ -V<V_{out}<V$$

where $V_{out}$ is output DC voltage, K is the gain constant in volts/hertz, $f_L$ is the input frequency to the nearest lowest thousand, $f$ is the input frequency, $m$ is 0 or 1 and 1|V|1 is the DC limit on the output. The 1K Hz. increments of the output sawtooth signal are thus equal to the reciprocal of the predetermined delay $\tau$ which for purposes of illustration is assumed to be 1000 microseconds.

In terms of a sine function, the inputs to the set and reset of the phase detector 21 or phase detector 23 are sin $\omega t$ and sin $(\omega t-\omega\tau)$, respectively, where $\omega\tau$ represents the phase shift of the delay network 20 as a function of frequency where the points of discontinuity A and B FIG. 3 can be seen to occur at $\omega\tau 2\pi$ radians or $$f=\frac{1}{\tau}\text{Hz.}$$

and thus, as the frequency varies, the phase relationship varies so that different DC voltages are obtained as a function of frequency.

Referring again to FIG. 2, there is shown a typical pulse diagram disclosing the Q and $\overline{Q}$ outputs of one of the phase detectors, for three different phase relationships, i.e., $\omega\tau=45°$, 180° and 315°. In practice, the phase detector output is taken between Q and $\overline{Q}$ and applied to the input of its associated integrator. The output of the integrator is, as indicated, in the form of a sawtooth. Without regard to polarity, it can be seen by reference to FIG 4 that the phase detector 20 output voltage and accordingly, the associated integrator output voltage is a minimum at 0° and a maximum 360°, zero output voltage is obtained at 180°.

While similar in form, the outputs of integrators 24, 25 are, as noted in FIGS 3 and 4, displaced as a function of frequency by $1/2\tau$ hertz relative to each other. This apparent ½ cycle shift is brought about by referencing both phase detectors 21, 23 with the signal from delay network 20 and triggering each detector with the leading and lagging edge of the input pulse from square wave symmetry control circuit, respectively.

The relative phase displacement of the output sawtooth wave forms is used to avoid the discontinuities and resulting distortion which arise at the transition points A and B as shown in FIGS 3, 4.

Referring to FIG. 1, the outputs of capacitors 26, 27 are alternatively or successively coupled to transient suppressor 6 and high pass filter 7 by means of a double-pole, double-throw relay 30 controlled by amplitude sensitive switch 5. In a first position, relay 30 passes the signal from capacitor 26 via pole $c$ and contact $g$ to transient suppressor 6. In a second position, relay 30 passes the signal from capacitor 27 via pole $d$ and contact $h$ to transient suppressor 6. The signal to be passed is determined by the amplitude of the signal as measured at the output of integrators 24, 25 by amplitude sensitive switch 5.

In practice, switching is effected from one output to the other when the output being monitored reaches 75 percent of its maximum. Accordingly, the distortion which occurs at transition points A and B as shown in FIGS. 3, 4 will not be monitored.

Transient suppressor 6, in addition to passing the signal from either capacitor 26 or 27 to high pass filter 7, provides also for the elimination of transients due to differing DC and AC levels on the outputs of capacitors 26, 27 at the time of switching.

An operational amplifier 31 is connected to contacts $g$ and $j$ of relay 30 for receiving the signal from either capacitor 26 or 27 depending on the position of relay 30. A feedback amplifier 32 is coupled to the output of amplifier 31 for feeding back to the output of the capacitor not being monitored via contacts $h$ and $k$ the same signal in both amplitude and phase as that being monitored. The result is that when switching occurs, the signal received by high pass filter 7 is the same as that which existed on the output of the capacitor which was being monitored at the time of switching. In order to reduce time lag in signals generated by the frequency discriminator 4, the unused capacitor is loaded by a low resistance 33 to ground coupled to the output of the feedback amplifier 32. Since the signal received by high pass filter 7 is the same regardless of which of the outputs of capacitors 26, 27 is being monitored, the signal to the high pass filter 7 is not distorted, does not ring and consequently no information is lost and no switching transients are recorded.

Alternatively, as shown in FIG. 5, amplifier 31 may be omitted and high pass filter 7 connected directly to contacts $g$ and $j$ of relay 30. In that event, capacitors 26 and 27 will be replaced by capacitors 26' and 27', in practice, the input capacitor of high pass filter 7, now 7', split between the two outputs of frequency discriminator 4.

What is claimed is:

1. A frequency measuring circuit for producing output signals having an amplitude indicative of the frequency of an input signal comprising in combination: first and second phase comparing means for receiving said input signal and generating first and second pulse signals, each having a duty cycle indicative of the frequency of said input signal; an integrator means coupled to said first and second phase comparing means for receiving said first and second pulse signals and producing therefrom first and second output signals each having an amplitude indicative of the frequency of said input signal, said first phase comparing means comprises: a first flip-flop having said input signal coupled to one of its inputs; and a delay means coupled to a second input of said flip-flop, said delay means receiving said input signal and providing at said input a delayed input signal, said second phase comparing means comprises: a second flip-flop; an inverter coupled to a first input of said second flip-flop, said input signal being coupled to said inverter, said delay line being coupled to a second input of said flip-flop.

2. A frequency measuring circuit for producing output signals having an amplitude indicative of the frequency of an input signal comprising in combination: first and second phase comparing means for receiving said input signal and generating first and second pulse signals, each having a duty cycle indicative of the frequency of said input signal; an integrator means coupled to said first and second phase comparing means for receiving said first and second pulse signals and producing therefrom first and second output signals each having an amplitude indicative of the frequency of said input signal and, switch means for connecting a selected one of said output signals to a pair of output terminals, said switch means including amplitude sensing means to activate said switch whenever the amplitude of said selected one of said output signals reaches a predetermined level.

References Cited

UNITED STATES PATENTS

| | | | |
|---|---|---|---|
| 3,003,107 | 10/1961 | Charbonnier | 324—82 XR |
| 3,211,993 | 10/1965 | Golden et al. | |
| 2,563,256 | 8/1951 | Lord et al. | 329—107 |
| 3,187,195 | 6/1965 | Stefnov | 329—106 XR |

ALFRED E. SMITH Primary Examiner